Masaaki Sato,
INVENTOR.

BY Wenderoth, Lind and Ponack, Attorneys

Masaaki Sato,
INVENTOR.
BY Wenderoth, Lind and Ponack, Attorneys

Dec. 31, 1968 MASAAKI SATO 3,419,226

TAPE RECORDER

Filed Oct. 17, 1966 Sheet 3 of 3

Masaaki Sato

INVENTOR.

BY Wenderoth, Lind and Ponack, Attorneys 3,419,226
TAPE RECORDER
Masaaki Sato, Hackiohji-shi, Tokyo, Japan, assignor to Olympus Optical Co., Inc., Tokyo, Japan
Filed Oct. 17, 1966, Ser. No. 587,204
Claims priority, application Japan, Oct. 21, 1965
40/85,757, 40/85,758
3 Claims. (Cl. 242—55.13)

ABSTRACT OF THE DISCLOSURE

Tape recorder for use with a thin flat rectangular box-like shaped tape cartridge. The tape recorder has a thin flat housing having a loading recess in the upper surface of said housing opening out of the housing transversely of the thickness thereof and suitably sized to receive a cartridge therein. Tape driving shafts, a capstan shaft and guide shafts extend upwardly from within the recess being adapted to fit into corresponding holes in the cartridge for cooperation therewith when the cartridge is loaded in the loading recess in a direction transverse to the thickness of the cartridge. Means are provided to locate the cartridge horizontally prior to the engagement of said driving shafts, capstan shaft and guide shafts with the corresponding holes of the cartridge when the cartridge is placed in the loading recess. Means are also provided which are engageable with the cartridge for releasably holding the cartridge in a properly loaded position after the cartridge is depressed into the loading recess. The arrangement assures not only easy and quick loading of the cartridge in the loading recess but also quick detachment of the cartridge from the tape recorder.

This invention relates to a tape recorder, and more particularly to an improvement in a guide means in the tape recorder for easily and quickly loading and unloading a cartridge containing therein a tape on which sounds are to be recorded from which they are to be reproduced.

In the prior art tape recorders, the tape is reeled onto a supply reel which is to be mounted on the shaft of the recorder and the leading edge of the tape must be threaded through the recording and reproducing head of the recorder and attached to the takeup reel which is also mounted on the shaft of the recorder before the recorder is played, thereby necessitating a troublesome and time consuming operation.

Another type of well known tape recorder utilizes a cartridge in which the tape is contained and the cartridge is mounted on the tape recorder by aligning the holes in the cartridge with the shafts for operating the cartridge provided on the tape recorder. However, this aligning operation is troublesome and time-consuming making the tape recorder inconvenient for use, because the operator must peep into the clearance between the cartridge and the recorder from the side for aligning the holes of the cartridge with the shafts of the recorder.

This invention avoids the above mentioned disadvantages in the prior are tape recorders and provides improved guide means in a tape recorder for easily and quickly loading and unloading a cartridge containing a tape therein on the tape recorder by one hand even in a dark place such as in the pocket of a jacket.

Therefore, the object of this invention is to provide a tape recorder with improved guide means for easily and quickly loading and unloading the cartridge containing therein a tape.

This invention is suitable to be utilized in a miniature size tape recorder which can be carried in the pocket of a jacket. The tape recorder according to the invention can be properly loaded with a cartridge and the cartridge can be easily detached from the tape recorder to be replaced by another cartridge by a groping operation while they are kept in the pocket of the jacket. The tape recorder according to the invention is particularly convenient for operating in an upstanding position of the operator. Further, when the cartridge is loaded on the tape recorder of the invention, the cartridge is held in position by releasably holding means holding it against spring means forcing the cartridge to be springingly detached from the tape recorder. Therefore, upon releasing the holding means, the cartridge is immediately detached from the tape recorder, thereby permitting the tape recorder to be operated in the pocket of the jacket and the like by one hand even in a groping manner.

Figure 1:
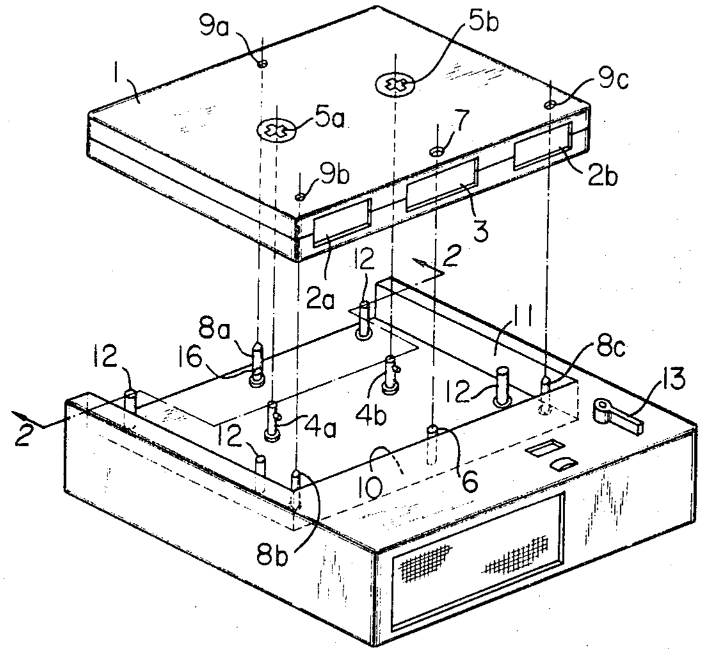
Figure 2:
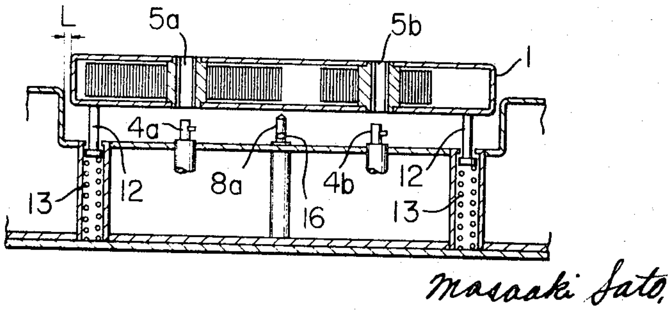
Figure 3:
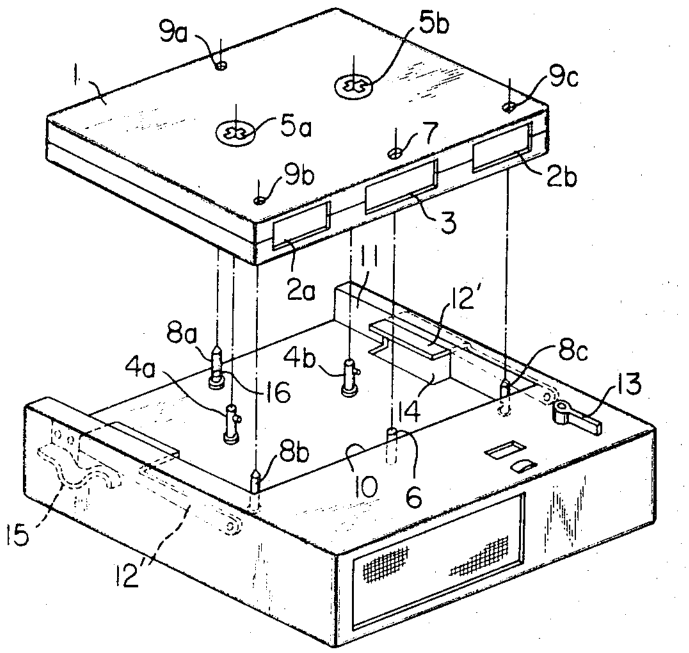
Figure 4:
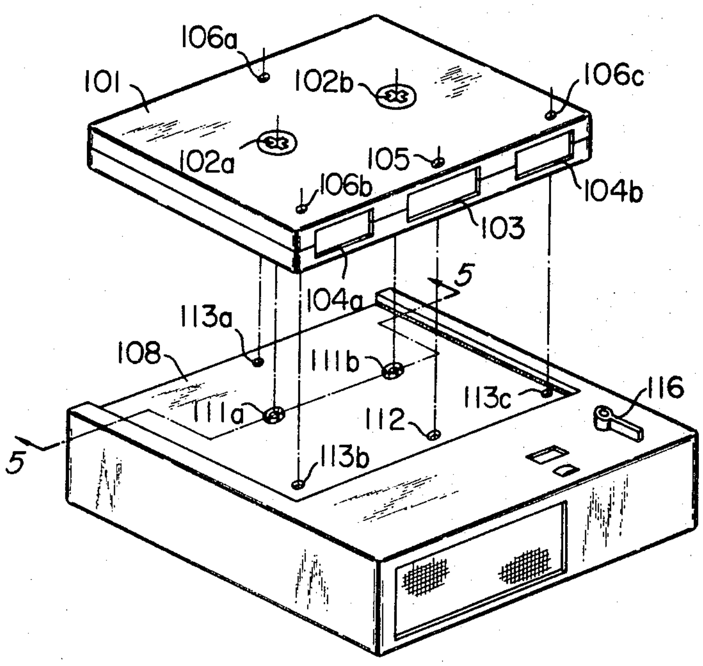
Figure 5:
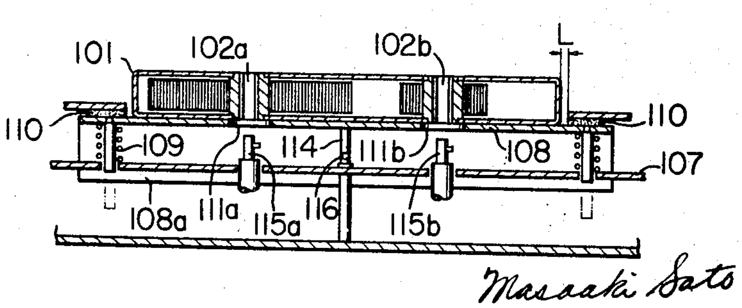

The invention will be described in detail with reference to the accompanying drawings illustrating the preferred embodiments of the invention in which:

FIG. 1 is a perspective view of the tape recorder provided with guide means according to the invention wherein the cartridge for the tape is detached upwardly from the tape recorder, FIG. 2 is a cross-sectional view along line 2—2 of FIG. 1 wherein the cartridge is located on the tape recorder above the loading recess of the tape recorder, FIG. 3 is a perspective view similar to FIG. 1 showing another embodiment of the guide means of the invention, FIG. 4 is a perspective view of a further embodiment of the invention in which the cartridge is detached upwardly from the tape recorder, and FIG. 5 is a cross-sectional view along line 5—5 of FIG. 4 in which the cartridge is located on the tape recorder above the loading recess thereof.

Tape cartridge 1 shown in FIG. 1 contains therein a tape having double tracks for recording sounds. A pair of windows 2*a* and 2*b* are provided symmetrically in one side wall of the cartridge, said windows 2*a* and 2*b* being adapted to receive recording and reproducing heads of the recorder when the cartridge is mounted. The tape is adapted to record and reproduce sounds in one of the two tracks when the cartridge is mounted on the recorder in one position, and thereafter, in the reversed position of the cartridge on the tape recorder, it is adapted to record and reproduce sounds in the other of the two tracks, this arrangement being well known. A window 3 is provided intermediate said pair of windows 2*a* and 2*b*, said window 3 being adapted to receive pinch roller means of the tape recorder. Rotatable shafts 4*a* and 4*b* projecting upwardly from the tape recorder as shown in FIG. 1 are adapted to detachably receive hollow shafts rotatably supported in the cartridge for winding the tape, respectively, the tape being taken up from one of said hollow shafts onto the other of said hollow shafts while the tape has sounds recorded or sound reproduction is effected. Capstan shaft 6 upstanding from the tape recorder is adapted to fit within a hole 7 of the cartridge. Several (three in the drawing) stud shafts 8*a*, 8*b* and 8*c* upstanding from the tape recorder for guiding the cartridge when the cartridge is loaded on the tape recorder are adapted to fit into corresponding holes 9*a*, 9*b* and 9*c* provided in the cartridge, respectively.

The above mentioned arrangement of the tape recorder was well known in the art. However, the prior art tape recorder of the above described type lacks the means for conveniently aligning the shafts upstanding from the tape recorder with the corresponding holes in the cartridge for fitting the shafts into the holes when the cartridge is loaded on the tape recorder, thereby necessitating a troublesome and time consuming operation therefor. The characteristic feature of the invention lies in side wall means 11 for defining the position of cartridge 1 for loading thereof on the tape recorder provided in the tape recorder and the provision of a side wall 10 of the tape recorder from which wall 10 pinch roller means (not shown) and other means project for engaging with the tape in the cartridge through windows 3, 2*a* and 2*b* in the side wall of the cartridge when it is loaded on the tape recorder, said side wall means 11 being perpendicular to side wall 10 so as to define the position in which the cartridge is properly aligned with the loading recess of the recorder. In the embodiment shown in FIG. 1, said side wall means 11 is formed together with said side wall 10 so as to define a U-shape. However, side wall means 11 may be provided to form an L-shape together with side wall 10, or additional side wall means may be provided to form a rectangular recess therein together with said side wall means 11 and said side wall 10.

The depth of the loading recess in the tape recorder thus bounded by said side wall 10 and side wall means 11 is preferably determined so that the top surface of the cartridge is flush with the upper edges of said side walls 10 and 11 when the cartridge is properly loaded on the tape recorder.

Bearing studs 12 project from the bottom surface of the cartridge loading recess of the tape recorder at the positions adjacent to each of four corners thereof, said bearing studs 12 being biased by means of springs 13 so as to urge said studs 12 to the projected positions. The relative position of the top end of each of the aforementioned shafts and studs is such that the top ends of said four bearing studs 12, which have the same height, are slightly lower than the upper edges of said side walls surrounding these bearing studs, and the top ends of guide shafts 8*a*, 8*b* and 8*c*, which are the same height, are slightly lower than the top ends of said studs 12 when the studs are urged to their projecting positions, and, further, the top ends of the tape driving shafts 4*a* and 4*b*, which have the same height, are slightly lower than the height of the top ends of said guide shafts 8*a*, 8*b* and 8*c*. The top end of each of said guide shafts 8*a*, 8*b* and 8*c* is provided with conical tip end so as to facilitate the insertion thereof into the corresponding holes in the cartridge. When the cartridge is to be loaded on the tape recorder with the guide shafts of the tape recorder inserted into the corresponding holes of the cartridge, a slight clearance L exists between the outer side walls of the cartridge and the opposing side walls 10 and 11 of the tape recorder so as to facilitate the insertion of the cartridge into the loading recess of the tape recorder.

FIG. 3 shows another embodiment of the guide means according to the invention, wherein the bearing studs which are urged to project from the tape recorder by means of springs are replaced by swingable levers 12′ which are pivoted at the side wall means 11 and urged by means of springs 15 to be swung so as to force bent portions which are formed at the free ends of said levers and project inwardly from the side walls 11 through the cut off portions 14 in said side walls 11 upwardly so that the bent portions bear resiliently against the cartridge when the cartridge is placed on the tape recorder. The other elements of the embodiment shown in FIG. 3 are the same as those shown in FIG. 1, and therefore, the elements in the embodiment shown in FIG. 3 corresponding to those shown in FIG. 1 are designated by the same reference numerals used in FIG. 1 and a detailed explanation thereof is not necessary.

In operating the tape recorder according to the invention, the cartridge 1 is placed in the space bounded by the side walls 10 and 11 of the tape recorder utilizing the side walls 10 and 11 as aligning means for loading the cartridge on the tape recorder. Then the cartridge is placed on the tip ends of the bearing studs 12 or on the bent portions of levers 12′ so that the cartridge is held in parallel position to the recorder. The cartridge is then shifted slightly to and fro parallelly to the upper surface of the cartridge while it is lowered downwardly against the tape recorder by applying downward pressure by hand, thereby engaging guide shafts 8*a*, 8*b* and 8*c* with the corresponding holes in the cartridge so that shafts 8*a*, 8*b* and 8*c* are inserted into the corresponding holes of the cartridge, and, thereafter, tape driving shafts 4*a* and 4*b* fit into hollow shafts 5*a* and 5*b* of the cartridge. Thus, the cartridge can be properly loaded on the tape recorder with bearing studs 12 or levers 12′ being depressed against the force of the springs. Releasable holding means such as click stop means shown in the drawings as comprised of recesses 16 provided on each of the guide shafts 8*a*, 8*b* and 8*c* adapted to engage with the periphery of the corresponding holes 9*a*, 9*b* and 9*c* in the bottom plate of the cartridge so as to arrest the cartridge in position by the engagement of the recesses 16 with the periphery of the holes 9*a*, 9*b* and 9*c* in the bottom plate of the cartridge, one of the guide shafts, for example, shaft 8*a* being laterally movable within a limited range and biased outwardly by a spring (not shown) so that the cartridge is spring loaded laterally by the shaft 8*a* to cause the fitting of the edges of the holes in the recesses.

The engagement of the recesses 16 with the periphery of the holes 9*a*, 9*b* and 9*c* in the bottom plate of the cartridge is effected by the action of the shaft 8*a* due to the action of the spring thereby arresting the cartridge in position, said recesses 16 being located on each of the shafts so that they face toward the center of the loading recess, for example, and the lateral movement of the shaft 8*a* being in the direction passing the center of the loading recess, for example. Upon loading the cartridge in position on the tape recorder, the actuating means such as operating lever 13 shown in FIG. 1 is actuated by the operator and the tape recorder is operated to record sounds or reproduce sounds in the well known manner. After the recording or reproduction of sounds is finished operating lever 13 is returned to the original position to stop the operation. Thereafter, the cartridge may be detached from the tape recorder by releasing said holding means by operating the button so as to move shaft 8*a* laterally outwardly against the spring to disengage the recess 16 thereof from the periphery of the hole 9*a*, thereby causing lifting of the cartridge from the tape recorder by the action of the springs 13 which urge the bearing studs or levers upwardly from the tape recorder. The cartridge may then be loaded in the reverse position on the tape recorder or a new cartridge may be substituted for the used cartridge for operation on the tape recorder.

FIGS. 4 and 5 show a further embodiment of the invention, wherein the cartridge 101 has a flat rectangular box-like shape as in FIG. 1 and the recording tape having double tracks for recording sounds is contained in the cartridge. The tape reeled on one (102*a*) of the two hollow shafts 102 and 102*b* rotatably supported in the cartridge is unwound and it is taken up onto the other hollow shaft 102*b* while the sounds are recorded in one of the two tracks on the tape. When the recording is completed in one track, then the cartridge is unloaded from the tape recorder and it is reloaded in the reverse position so as to recorde sounds in the other track on the tape by unwinding the tape from hollow shaft 102*b* and taking it up onto hollow shaft 102*a*. A window 103 is provided at the center of one side wall of the cartridge as shown, window 103 being adapted to receive therein pinch roller means of the tape recorder when recording on the tape is effected. A pair of windows 104*a* and 104*b* are provided symmetrically on opposite sides with respect to said window 103 in said one wall of the cartridge, said pair of windows being adapted to receive therein recording and reproducing heads of the tape recorder, respectively. Besides said hollow shafts 102*a* and 102*b*, the cartridge is provided with a hole 105 for receiving the capstan shaft of the tape recorder adjacent said window 103 as well as several (three in the drawing) of holes 106*a*, 106*b* and 106*c* for receiving guide shafts 114 upstanding from the tape recorder so as to facilitate the loading of the cartridge on the tape recorder.

The top wall of the tape recorder is in the form of a U-shape having the area where the cartridge is to be passed through for loading the cartridge on the tape recorder removed. However, said top wall may be in the form of a closed rectangular shape as described in connection with the embodiment of FIG. 1. Intermediate plate 107 is fixedly mounted intermediate the top wall and bottom wall of the tape recorder (FIG. 5) substantially at the depth from the top wall of the recorder so that the top wall of the cartridge is flush with the top wall of the tape recorder when the cartridge is properly loaded on the tape recorder. Bearing plate 108 is vertically slidably mounted between said top wall and said intermediate plate 107, said plate 108 being biased by means of suitable springs 109 held between intermediate plate 108 and intermediate plate 107 so as to urge said plate 108 upwardly, said springs 109 surrounding the studs which are secured to bearing plate 108 and pass freely through the holes in intermediate plate 107. Normally, the peripheral edges of said bearing plate 108 are pressed against the lower surface of pad 110 secured to the rear surface of the edges surrounding said U-shape cut from said top wall, thereby preventing dust and harmful particles from entering the interior of the housing of the cartridge. A plurality of holes **111*a*, 111*b*, 112, 113*a*, 113*b* and 113*c* corresponding to hollow shafts 102*a*, 102*b*, holes 105, 106*a*, 106*b* and 106*c*, respectively, of the cartridge are provided in said bearing plate 108 having freely passing therethrough driving shafts 115*a*, 115*b*, the capstan shaft and guide shafts 114 of the tape recorder. One side edge of said bearing plate 108 which bears against the inner surface of one side wall of the housing of the tape recorder is provided with a depending web portion 108*a* which is formed by bending the edge portion of plate 108** downwardly thereby preventing dust or harmful particles from entering the interior of the housing through the clearance therebetween.

Guide shafts 114 for facilitating the loading of the cartridge on the tape recorder project from the bottom plate of the tape recorder or to said intermediate plate 107 at the positions immediately beneath said holes **113*a*, 113*b* and 113*c* of said bearing plate 108, respectively. The tip ends of said shafts 114 are located immediately adjacent to the rear surface of said plate 108 when it is held in the upwardly biased position. Driving shafts 115*a* and 115*b* for driving the tape in the cartridge are located in the housing of the tape recorder immediately beneath said holes 111*a* and 111*b* of said bearing plate 108, and the capstan shaft is located immediately beneath hole 112 of said bearing plate 108, said shafts 115*a* and 115*b* and the capstan shaft being parallel to said guide shafts 114 as is the case shown in FIGS. 1 to 3. The tip ends of said driving shafts and said capstan shaft preferably have a height somewhat less than the height of the tip ends of said guide shafts 114. As shown in FIG. 5, after the cartridge is placed on said bearing plate 108 which is held biased upwardly with the corresponding side walls of the cartridge and the tape recorder being adjacent to each other, the cartridge is shifted horizontally to and fro slightly within the range shown by L in FIG. 5 while the cartridge is depressed downwardly by hand against the action of springs 109 causing said bearing plate 108 to be urged upwardly, thereby fitting the tip ends of guide shafts 114 into corresponding holes 106*a*, 106*b* and 106*c* of the cartridge through corresponding holes 113*a*, 113*b* and 113*c* of said bearing plate 108. Thereafter said tape driving shafts 115*a* and 115*b* and the capstan shaft are fitted into corresponding hollow shafts 102*a*, 102*b* and hole 105 of the cartridge through corresponding holes 111*a*, 111*b* and 112 of said bearing plate 108**. When the cartridge is lowered in the loading recess of the tape recorder formed by said U-shape cut off from the top wall of the cartridge so that the upper surface of the cartridge becomes substantially flush with the upper surface of the top wall of the tape recorder, suitable releasable holding means such as click stop means shown in FIGS. 1 to 3 is actuated to hold the cartridge in position in the loading recess of the tape recorder.

After the cartridge is loaded properly on the tape recorder as described hereinbefore, an actuating member such as designated by reference numeral "116" in FIG. 4 is operated in the well known manner thereby moving recording head or reproducing head and pinch roller means of the tape recorder through corresponding windows in the side wall of the cartridge to cooperate therewith so as to record sounds on the tape in the cartridge or reproduce sounds. After completion of the operation, the cartridge is detached from the tape recorder by releasing said actuating member, thereby causing the cartridge to be lifted upwardly as shown in FIG. 5 by said bearing plate 108 which is urged upwardly by the action of springs 109. The cartridge may then be reloaded in reverse position or a new cartridge may be loaded on the tape recorder in the manner as described hereinbefore.

The prior art miniature tape recorder is not provided with side wall means for aligning the cartridge for facilitating the loading of the cartridge on the tape recorder. Therefore, in loading the cartridge on the tape recorder, it is difficult to align the guide shafts upstanding from the tape recorder with the corresponding holes of the cartridge, hence necessitating the operator to peep into the clearance between the rear side of the cartridge and the upper surface of the tape recorder from the side of the tape recorder so as to align the shafts and holes during the loading of the cartridge on the tape recorder. However, the cartridge is sometimes inclined on the tape recorder and it takes some time to load the cartridge properly on the tape recorder. Therefore, it is impossible for the operator to load the cartridge on the tape recorder in a groping manner such as in the pocket of a jacket.

On the contrary, the invention is constructed as described above, and the cartridge is guided by the side edges formed in the U-shape and the like as described above in the top plate of the tape recorder when the cartridge is loaded on the tape recorder. Therefore, the cartridge can be easily loaded properly on the tape recorder by one hand in a groping manner even in a dark place such as in the pocket of a jacket. And the cartridge is springingly released from the loading recess of the tape recorder upon releasing of the holding means by means of bearing studs, levers or bearing plate which are biased by the springs. This enables the operator to reload the cartridge in reverse position or to replace the cartridge by a new one with one hand even in the pocket of a jacket. The tape recorder provided with a bearing plate can cover all shafts upstanding from the tape recorder by the bearing plate in the non-used position thereby protecting the shafts and, at the same time, affording a good appearance.

What is claimed is:

1. Tape recorder for use with a thin flat rectangular box-like shaped tape cartridge containing therein a tape for recording sounds thereon and reproducing sounds and provided with windows in one side of the cartridge for receiving therethrough operating means of the tape recorder when the cartridge is loaded on the tape recorder, comprising: a thin flat housing having a loading recess in the upper surface of said housing opening out of the housing transversely of the thickness thereof and suitably sized to receive a cartridge therein; said loading recess being bounded by one vertical side wall depending from the upper surface of the recorder adapted to guide the insertion of the cartridge into said loading recess, operating means such as pinch roller means and the like movable through said depending side wall to be projected through said windows in the side wall of said cartridge, a pair of vertical side walls depending from the upper surface of the recorder and joined to said one vertical side wall at both ends thereof and extending at right angles thereto, respectively, and adapted to guide the insertion of the cartridge in said recess, and a bottom plate joined to the bottom of said depending side walls; tape driving shafts, a capstan shaft and guide shafts extending upwardly from said bottom plate, said driving shafts, capstan shaft and guide shafts being adapted to fit into corresponding holes in the cartridge for cooperation therewith when the cartridge is loaded in the loading recess in a direction transverse to the thickness of the cartridge: bearing studs extending upwardly through holes in said bottom plate, spring means connected to said studs biasing them axially, said studs being greater in height in the upwardly biased position than the height of said driving shafts, capstan shaft and guide shafts so as to locate the cartridge parallelly to the loading recess with the tip ends of said studs abutting against the bottom surface of the cartridge to locate the cartridge horizontally prior to the engagement of said driving shafts, capstan shaft and guide shafts with the corresponding holes of the cartridge when the cartridge is placed in the loading recess, said side walls bounding the loading recess and serving to guide the location of the cartridge; and means engageable with the cartridge for releasably holding the cartridge in a properly loaded position after the cartridge is depressed into the loading recess against the action of said bearing studs by the guiding action of said guide shafts engaging the corresponding holes in the cartridge; whereby the cartridge is springingly detached from the tape recorder upon releasing said releasable holding means, thereby assuring not only easy and quick loading of the cartridge in the loading recess but also quick detachment of the cartridge from the tape recorder.

2. Tape recorder for use with a thin flat rectangular box-like shaped tape cartridge containing therein a tape for recording sounds thereon and reproducing sounds and provided with windows in one side of the cartridge for receiving therethrough operating means of the tape recorder when the cartridge is loaded on the tape recorder, comprising: a thin flat housing having a loading recess in the upper surface of said housing opening out of the housing transversely of the thickness thereof and suitably sized to receive a cartridge therein; said loading recess being bounded by one vertical side wall depending from the upper surface of the recorder adapted to guide the insertion of the cartridge into said loading recess, operating means such as pinch roller means and the like movable through said depending side wall to be projected through said windows in the side wall of said cartridge, a pair of vertical side walls depending from the upper surface of the recorder and joined to said one vertical side wall at both ends thereof and extending at right angles thereto, respectively, and adapted to guide the insertion of the cartridge in said recess, and a bottom plate joined to the bottom of said depending side walls; tape driving shafts, a capstan shaft and guide shafts extending upwardly from said bottom plate, said driving shafts, capstan shaft and guide shafts being adapted to fit into corresponding holes in the cartridge for cooperation therewith when the cartridge is loaded in the loading recess in a direction transverse to the thickness of the cartridge: bearing lever means pivotally mounted in the housing, springs connected to said bearing lever means biasing said bearing lever means upwardly, the free end of said lever means having a flat portion extending horizontally into said loading recess, at least one of said pair of side walls bounding said loading recess having an aperture therein through which said flat portion extends, the upwardly biased horizontal position of said free end of said lever means being higher than said driving shafts, capstan shaft and guide shafts so that the bottom surface of the cartridge abuts first against the horizontal free end of said lever means to locate the cartridge horizontally prior to the engagement of said driving shafts, capstan shaft and guide shafts with the corresponding holes of the cartridge when the cartridge is placed in the loading recess, said side walls surrounding the loading recess and serving to guide the location of the cartridge; and means engageable with the cartridge for releasably holding the cartridge in a properly loaded position after the cartridge is depressed into the loading recess against the action of said bearing lever means by the guiding action of said guide shafts engaging with the corresponding holes in the cartridge; whereby the cartridge is springingly detached from the tape recorder upon releasing said releasable holding means, thereby assuring not only easy and quick loading of the cartridge in the loading recess but also quick detachment of the cartridge from the tape recorder.

3. Tape recorder for use with a thin flat rectangular box-like shaped tape cartridge containing therein a tape for recording sounds thereon and reproducing sounds and provided with windows in one side of the cartridge for receiving therethrough operating means of the tape recorder when the cartridge is loaded on the tape recorder, comprising: a thin flat housing having an upper plate with a loading recess cut therein suitably sized to receive a cartridge therein in a direction transverse to the thickness of the cartridge; said loading recess guiding the cartridge when it is loaded, pinch rollers and the like in the recorder movable through said windows in the side wall of said cartridge when the cartridge is in the loaded position, an intermediate plate mounted in the housing; tape driving shafts, a capstan shaft and guide shafts extending upwardly from said intermediate plate, said driving shafts, capstan shaft and guide shafts being adapted to fit into corresponding holes of the cartridge for cooperation therewith when the cartridge is loaded in the loading recess; a movable bearing plate located between the upper plate of the housing and said intermediate plate, spring means engaging said movable plate and biasing it upwardly to abut the under surface of the upper plate, studs secured to said bearing plate and extending downwardly through the holes in said intermediate plate and guiding said bearing plate in its vertical movement, said bearing plate having the size slightly greater than the size of the loading recess to cover the entire area of the loading recess and to have the edges thereof abut against the periphery of the upper plate around the loading recess and further having holes through which the driving shafts, capstan shaft and guide shafts of the tape recorder pass freely whereby, when the cartridge is placed on the bearing plate with the side wall thereof being guided by the edge of the loading recess cut in the upper plate of the housing, the cartridge is first held horizontally on the bearing plate prior to the engagement of said driving shafts, capstan shaft and guide shafts in the corresponding holes of the cartridge through the corresponding holes of the bearing plate; and means engageable with the cartridge releasably holding the cartridge in the loaded position after the cartridge is depressed into the loading recess against the action of said bearing plate with the guide shafts being engaged in the corresponding holes in the cartridge so that the cartridge is guided to the proper loaded position, the cartridge being springly released from the tape recorder upon releasing said releasable holding means, thereby assuring not only easy and quick loading of the cartridge in the loading recess but also quick detachment of the cartridge from the tape recorder.

References Cited

UNITED STATES PATENTS

| | | | |
|---|---|---|---|
| 2,099,375 | 11/1937 | Seward | 248—20 X |
| 3,059,882 | 10/1962 | Staar | 248—20 |
| 3,146,316 | 8/1964 | Knoth | 179—100.2 |
| 3,273,815 | 9/1966 | Schuller | 242—55.13 X |

LEONARD D. CHRISTIAN, *Primary Examiner.*